US012324786B2

(12) United States Patent
Stickney

(10) Patent No.: US 12,324,786 B2
(45) Date of Patent: Jun. 10, 2025

(54) DETERMINING CHEST COMPRESSION DEPTH USING IMPEDANCE

(71) Applicant: PHYSIO-CONTROL, INC., Redmond, WA (US)

(72) Inventor: Ronald Stickney, Edmonds, WA (US)

(73) Assignee: PHYSIO-CONTROL, INC., Redmond, WA (US)

( * ) Notice: Subject to any disclaimer, the term of this patent is extended or adjusted under 35 U.S.C. 154(b) by 707 days.

(21) Appl. No.: 17/222,700

(22) Filed: Apr. 5, 2021

(65) Prior Publication Data

US 2021/0308004 A1 Oct. 7, 2021

Related U.S. Application Data

(60) Provisional application No. 63/005,591, filed on Apr. 6, 2020.

(51) Int. Cl.
*A61H 31/00* (2006.01)

(52) U.S. Cl.
CPC ... *A61H 31/005* (2013.01); *A61H 2201/5023* (2013.01); *A61H 2201/5058* (2013.01)

(58) Field of Classification Search
CPC .................. A61H 31/005; A61H 31/00; A61H 2031/001–003
See application file for complete search history.

(56) References Cited

U.S. PATENT DOCUMENTS

| | | | | |
|---|---|---|---|---|
| 6,224,562 | B1 * | 5/2001 | Lurie | A61N 1/3601 607/42 |
| 8,652,077 | B2 * | 2/2014 | Centen | A61N 1/39044 324/207.17 |
| 2006/0015044 | A1 * | 1/2006 | Stavland | A61B 5/113 601/41 |
| 2010/0228166 | A1 * | 9/2010 | Centen | A61N 1/0492 600/587 |
| 2012/0136286 | A1 * | 5/2012 | Nova | G16H 40/63 601/41 |
| 2012/0330109 | A1 * | 12/2012 | Tran | A61B 5/14532 600/509 |
| 2013/0023781 | A1 * | 1/2013 | Freeman | A61B 5/091 601/41 |
| 2015/0120201 | A1 * | 4/2015 | Silver | G01P 3/42 702/19 |
| 2016/0128899 | A1 * | 5/2016 | Lurie | A61G 13/1215 601/41 |
| 2017/0106183 | A1 * | 4/2017 | Silver | A61N 1/046 |
| 2017/0181925 | A1 * | 6/2017 | Oppenheimer | G16H 20/40 |
| 2018/0140857 | A1 * | 5/2018 | Liu | G16H 20/30 |

FOREIGN PATENT DOCUMENTS

| | | | | |
|---|---|---|---|---|
| WO | WO-2015003509 | A1 * | 1/2015 | A61B 5/0809 |

* cited by examiner

*Primary Examiner* — Joseph D. Boecker
*Assistant Examiner* — Thomas W Greig
(74) *Attorney, Agent, or Firm* — Miller Nash LLP

(57) ABSTRACT

A medical device for indicating a chest compression depth, including a first electrode assembly structured to be disposed on a chest of a patient, a second electrode assembly structured to be disposed on a back of the patient, and a processor configured to determine a chest compression depth as a proportion of chest height based on a first impedance measurement between the first electrode assembly and the second electrode assembly when the chest is not compressed and a second impedance measurement between the first electrode assembly and the second electrode assembly when the chest is compressed.

22 Claims, 5 Drawing Sheets

DETERMINING CHEST COMPRESSION DEPTH USING IMPEDANCE

PRIORITY

This disclosure claims benefit of U.S. Provisional Application No. 63/005,591, titled "DETERMINING CHEST COMPRESSION DEPTH USING IMPEDANCE," filed on Apr. 6, 2020, which is incorporated herein by reference in its entirety.

FIELD OF THE INVENTION

This disclosure is directed to systems and methods for determining depth of chest compressions, for example, during the administration of cardiopulmonary resuscitation (CPR). In particular, this disclosure relates to determining the chest compression depth as a proportion of the chest height based on impedance measurements.

BACKGROUND

During a rescue situation, a rescuer may be required to perform chest compressions on a patient. However, it can sometimes be difficult to adequately determine the depth of the chest compressions for the rescuer and if chest compressions are not performed at a particular depth, they may not be effective. To combat this, CPR assist technologies can provide feedback to a rescuer regarding the depth of the compressions being performed. Conventional CPR assist technologies, however, have a number of issues that result in either inaccurate chest compression depth determination and/or rescuer pain.

For example, some CPR assist technologies require the use of a puck on the sternum of a patient, which can results in hand pain for the rescuer as the rescuer performs chest compressions. Accelerometer-based CPR assist devices, which may not require the puck on the sternum, often underestimate the depth of the chest compressions during CPR if the patient is on a compressible surface, such as a hospital bed or stretcher. Further, force based CPR assist devices often do not work well because it can take anywhere from 200 to 600 Newtons to compress a chest of a patient 50 millimeters.

Accordingly, there is a need for CPR assist technologies that are accurate and beneficial for both the rescuer and the patient. Embodiments of the disclosure address these and other deficiencies of the prior art.

BRIEF DESCRIPTION OF THE DRAWINGS

Aspects, features and advantages of embodiments of the present disclosure will become apparent from the following description of embodiments in reference to the appended drawings in which.

DESCRIPTION

Figure 1:
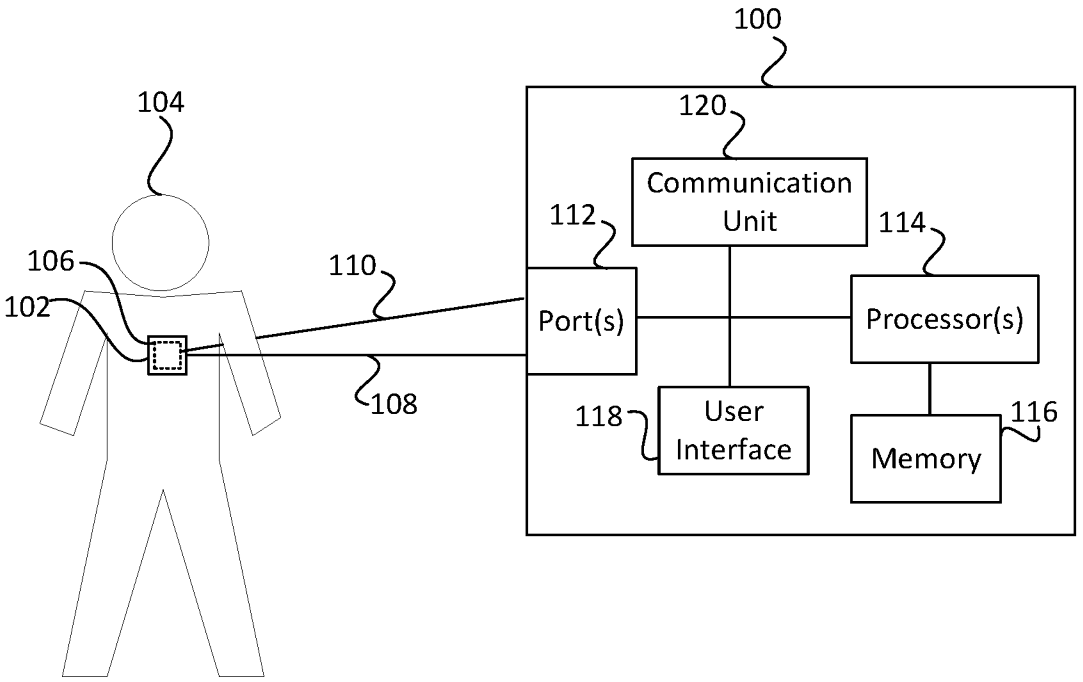
FIG. 1 is an illustration of a rescue scene using a CPR assist real-time feedback device according to some embodiments of the disclosure.

FIG. 1 illustrates an example of a CPR assist real-time feedback device 100 electrically connected to a first electrode assembly 102 coupled to or disposed on a chest of a patient 104 and a second electrode assembly 106 coupled to or disposed on a back of the patient 104. For ease of illustration, the second electrode assembly 106 is shown with dashed lines, but would be coupled to the back of the patient 104. The first electrode assembly 102 and second electrode assembly 106 can receive and transmit signals 108 and 110 from and to the CPR assist real-time feedback device 100. Although FIG. 1 illustrates the electrode assemblies 102 and 106 wired to the CPR assist real-time feedback device 100 for ease of illustrations, the electrode assemblies may also receive and transmit the signals wirelessly.

The CPR assist real-time feedback device 100 can include one or more ports 112 to receive and send signals 108 and 110 from and to the electrode assemblies 102 and 106. The CPR assist real-time feedback device 100 also includes one or more processors 114 connected to the one or more ports 112 and a memory 116. The CPR assist real-time feedback device 100 can also include a user interface 118. The user interface 118 may receive an input from a user and may also relay information to a user, such as through a speaker and/or a visual display.

As will be understood by one skilled in the art, the CPR assist real-time feedback device 100 may also include other hardware within the device that electrically communicate with the one or more processors 114. The one or more processors 114 may communicate with the other hardware components, such as filters or other devices, to perform any required analysis of the received signals. The CPR assist real-time feedback device 100 may also include a communication unit 120 to receive or transmit data outside of the CPR assist real-time feedback device 100.

The first electrode assembly 102 and the second electrode assembly can send and/or receive signals 108 and 110 to the CPR assist real-time feedback device 100 to determine an impedance. For example, the first electrode assembly 102 may output a current and the second electrode assembly 106 can sense the resulting voltage, or vice versa. The one or more processors 114 can then determine the impedance of the patient 104 based on the sensed voltage and the output current. The current output by either one of the electrode assemblies 102 or 106 may be in the range of 10 kilohertz to 100 kilohertz. The voltage may be sensed when the chest of the patient 104 is not compressed and when the chest is compressed to determine an impedance before a chest compression and at the peak of a chest compression. The one or more processors 114 can use the determined impedance when the chest is not compressed and when the chest is compressed to determine the chest compression depth as a proportion of the chest height of the patient.

The determined impedance is a complex number that includes an in phase, or resistive, component and a quadrature, or reactive, component. The one or more processors 114 can use the magnitude of the impedance to determine the chest compression depth in some embodiments. In other embodiments, only the in-phase or the resistive impedance may be used for the determination of chest compression depth.

In some embodiments, the signals to and from the electrode assemblies 102 and 106 are transmitted continuously. A continuous impedance measurement, which indicates the chest compression depth, may then be saved in the memory 116. In some embodiments, the one or more processors 114 can also determine and save in memory 116 the chest compression depth as a proportion of chest height continuously based on the continuous impedance measurement. That is, either the continuous impedance measurement may be saved in memory 116 and later used to in post-processing to determine the chest compression depth and/or the one or more processors 114 may cause the actual continuous chest compression depth determined to be saved in memory 116.

The one or more processors 114 can determine which impedance measurement relates to when the chest is not compressed and the signal when the chest is compressed by comparing the changes in impedance over time. Based on that determination, the one or more processors 114 can determine the chest compression depth as a proportion of chest height.

Figure 2:
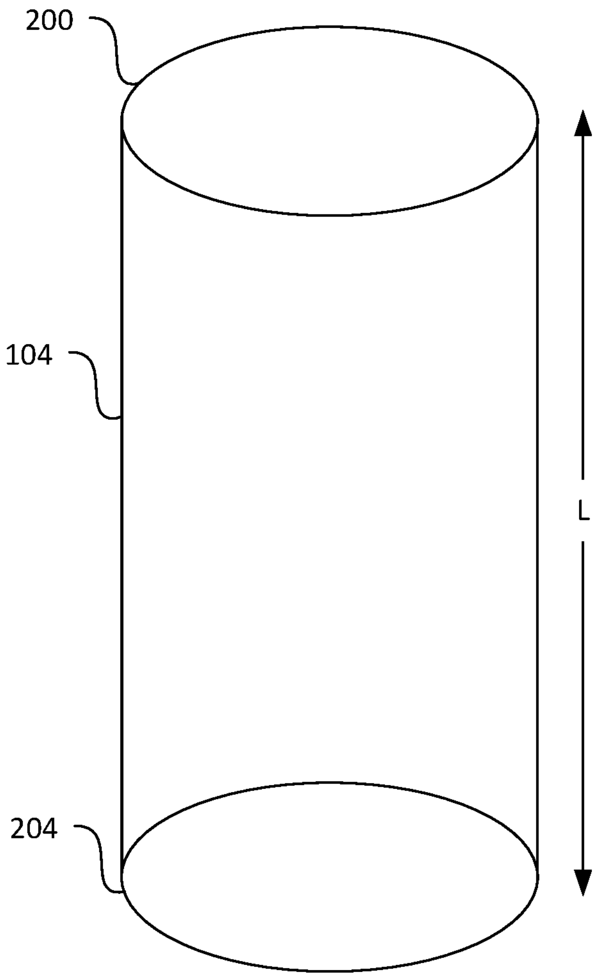
FIG. 2 illustrates a model of an impedance between a pair of electrodes.

FIG. 2 is a model of the impedance between a pair of electrodes 200 and 202 connected to a patient 104. Each electrode 200 and 202 has an area A, and the impedance Z can be determined by the impedivity ρ, the length L of the patient tissue between the electrodes 200 and 202, and the area A, such as shown in equation (1):

$$Z = \frac{\rho L}{A} \tag{1}$$

That is, the impedance is proportional to the length L of the patient tissue, which is the chest height. During compressions of the chest, the length of the tissue changes the most while the areas of the electrodes 200 and 202 will not change. As the chest of the patient 104 is compressed, the length L decreases and therefore the impedance proportionally decreases.

Accordingly, to determine the depth as a proportion of height (D), the impedance can be measured before the compression begins (Zhigh) and at the maximum depth (Zlow). As mentioned above, the electrode assemblies may send constant impedance signals and Zhigh and Zlow can be determined based on the high and low values of the impedance signals. For example, the impedance will oscillate between high and low as compressions are performed. Each peak, or high, can be used as Zhigh or when the chest is not compressed. Each valley, or low, can be used as Zlow or when the chest is compressed.

To determine the depth as a proportion of height, D, the one or more processors 114 may use equation (2):

$$D=k*(\text{Zhigh}-\text{Zlow})/\text{Zhigh} \tag{2}$$

Where k is a constant, which may be stored in the memory 116 of the CPR assist real-time feedback device 100. The one or more processors 114 can receive the impedance signals indicating Zhigh and Zlow and then determine the depth as a proportion of height D using equation (2) above.

The constant k, stored in memory 116, may be determined by measuring a chest height H and a compression depth C for a number of patients and using that data to determine the depth as a proportion of chest height D. Based on this information, and equation (2), a k value may be determined for each patient. That is, k may be determined in some embodiments using the following equation (3):

$$k = D*\frac{Zhigh}{Zhigh - Zlow} = (H - C)*\frac{Zhigh}{H*(Zhigh - Zlow)} \tag{3}$$

The constant k value may then be set based on the acquired k values for all the patients and this constant k value is stored in memory 116. In some embodiments, patients may be grouped based on a characteristic, such as size. The constant k value may be determined for each group of patients based on the characteristic. For example, a rescuer may be able to select in the user interface 118 a patient size, such as pediatric, underweight, average weight, or overweight before performing the chest compressions. Based on the patient size selected in the user interface 118, a constant k from memory 116 is selected and used to determine the chest compression depth based on equation (2) above.

As the one or more processors 114 determine the depth for each chest compression, the one or more processors 114 can instruct the user interface 118 to provide feedback to a rescuer. For example, a target depth may be set as a percentage or proportion of height. A target depth may be, in some embodiments, 24%, which is a depth of 56 millimeters on an average male chest height of 232 millimeters or 50 millimeters on an average female chest height of 209 millimeters. The target depth may include a range in some embodiments, such as between 20% to 34% depth of the chest height, or may be a narrower range such as 23% to 25%.

The one or more processors 114 may instruct the user interface 118 to output the actual chest compression depth as a proportion of height continuously as the chest is compressed in some embodiments. For example, the chest compression depth as a proportion of height may be continuously displayed or alerted to a rescuer as the chest is compressed.

In some embodiments, that may include alerting a rescuer whether the actual chest compression depth as a proportion of height is within a desired range. In other embodiments, the user interface 114 may just alert a user if they are within the target range, such as by using a green light, or outside a target range, such as by using a red light. Other alerts may also be used, such as alerting a user if they are close to the target depth by using another color, such as orange. Although a light is discussed for the user interface 114, as will be understood by one skilled in the art, the target depth and actual chest compression depth may be actually displayed on a display or may be announced audibly to a user.

Figure 3:
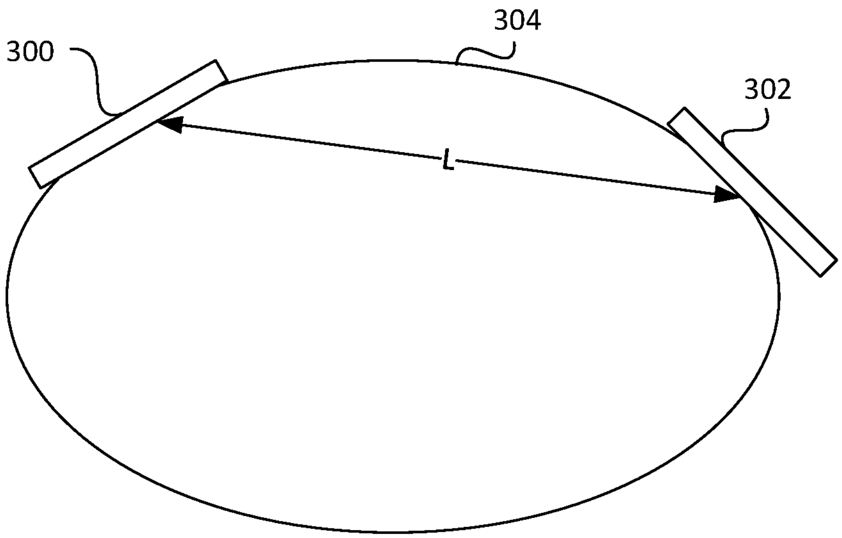
FIG. 3 illustrates an anterior and lateral placement of a pair of electrode assemblies.

FIG. 3 illustrates a standard anterior-lateral defibrillation lead placement for electrodes 300 and 302 on a patient 304. If anterior electrode 300 and lateral electrode 302 are placed in this position, pushing down on the sternum causes the chest width L to increase, which increases L and therefore the impedance. However, in this electrode 300 and 302 placement, the changes in impedance measured are poorly correlated with compression depth.

Figure 4:
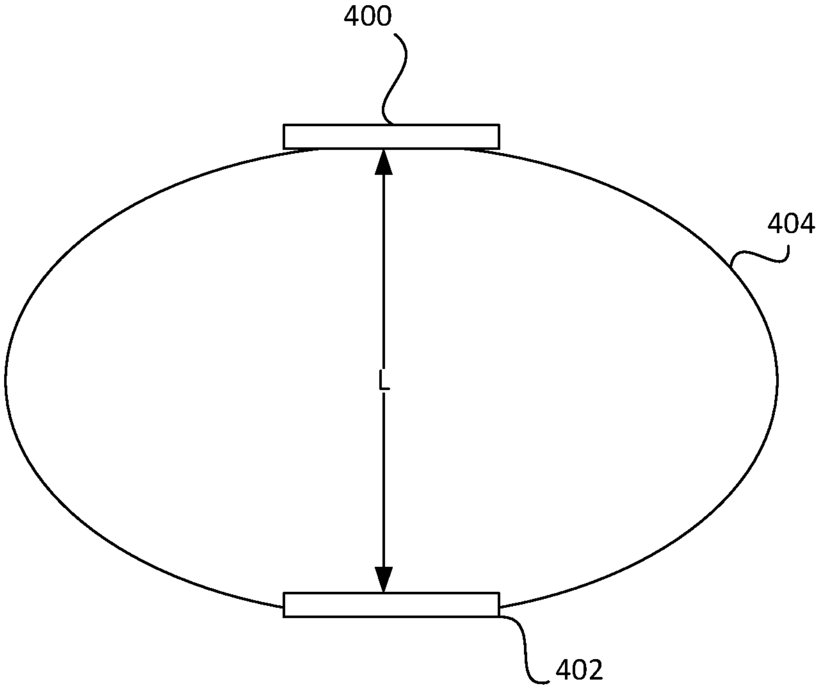
FIG. 4 illustrates an anterior and posterior placement of a pair of electrode assemblies according to embodiments of the disclosure.

FIG. 4, however, illustrates the electrode placement according to embodiments of the disclosure. A first electrode assembly 400 is disposed or coupled on the anterior, or chest, of the patient 404, while the second electrode assembly 402 is disposed or coupled on the posterior, or back, of the patient. When the sternum is pressed down, the change in L, and therefore the change is impedance, is highly correlated with the compression depth a proportion of height.

In some embodiments, the first electrode assembly 400 and the second electrode assembly 402 may have a conductive area between 10 and 50 square centimeters. However, in other embodiments, smaller electrodes with a conductive less than or equal 10 centimeters, such as those used for electrocardiogram monitoring, may be used. Since the conductive area of the smaller electrodes is less, the impedance will be much larger in equation (1) above. However, the impedance will still largely be proportional to the length L, and therefore the chest compression depth as a proportion of chest height can still be determined using equation (2) as discussed above.

While FIG. 4 illustrates the electrode assemblies 400 and 402 directly in the center of the patient's chest and back, the electrode assemblies 400 and 402 may not be directly on the center of the sternum and spine of the patient 404. For example, in some embodiments, a center of the first electrode assembly 400 may be placed within 100 millimeters of the sternum of the patient 404 and the second electrode assembly 400 is also placed within 100 millimeters of a spine of the patient 404 directly posterior to the first electrode assembly 400.

Figure 5:
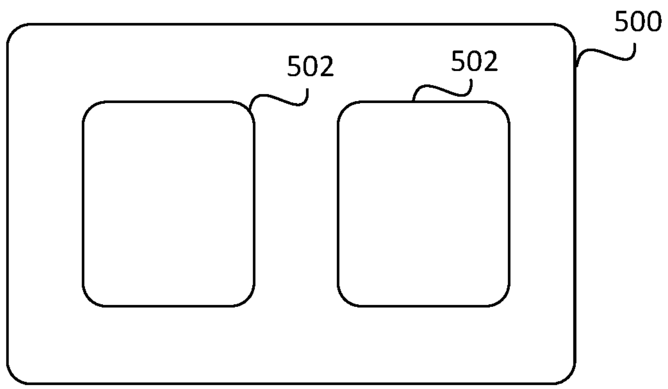
FIG. 5 illustrates an example electrode assembly according to some embodiments of the disclosure.

The electrode assemblies discussed above with respect to FIGS. 1 and 4 can include one or more electrodes. For example, in some embodiments, as illustrated in FIG. 5, the electrode assemblies 500 can each include two electrodes 502. One electrode assembly can be used to deliver the current used to measure impedance and the other electrode assembly can be used to measure the voltage to determine the impedance. The pair of electrodes 500 can be the same or similarly sized, as shown in FIG. 5, can include a small electrode and a large defibrillation electrode, or may include a small electrode 500 surrounded by a second electrode 500 that is a ring.

Figure 6:
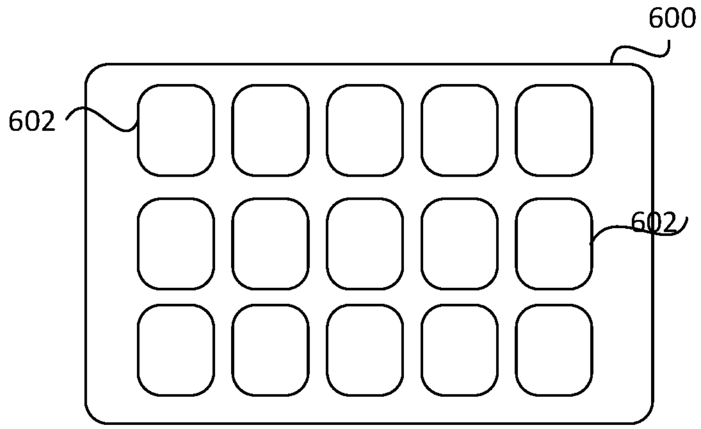
FIG. 6 illustrates another example electrode assembly according to other embodiments of the disclosure.

FIG. 6 illustrates another example of an electrode assembly 600 that may be used for the electrode assemblies discussed above with respect to FIGS. 1 and 4. The electrode assembly 600 may include multiple electrodes 602 as shown in FIG. 6. Although the electrodes 602 in FIG. 6 are ordered or in a matrix, embodiments of the disclosure are not limited to this configuration and any configuration of multiples of electrodes 602 may be used.

If an electrode assembly 600 with multiple electrodes 602 is used for measuring an impedance, then each sensing electrode 602 of the sensing electrode assembly may have a different impedance measurement. As such, the one or more processors 114 may compare the impedance measurement or determination from each electrode 602 and then select the measurement from the electrodes 602 that have the biggest change in impedance between when the chest is not compressed and compressed, as these electrodes are likely to have the most accurate reading of the actual chest compression depth, as they are measuring the impedance at the deepest point in the compression.

Figure 7:
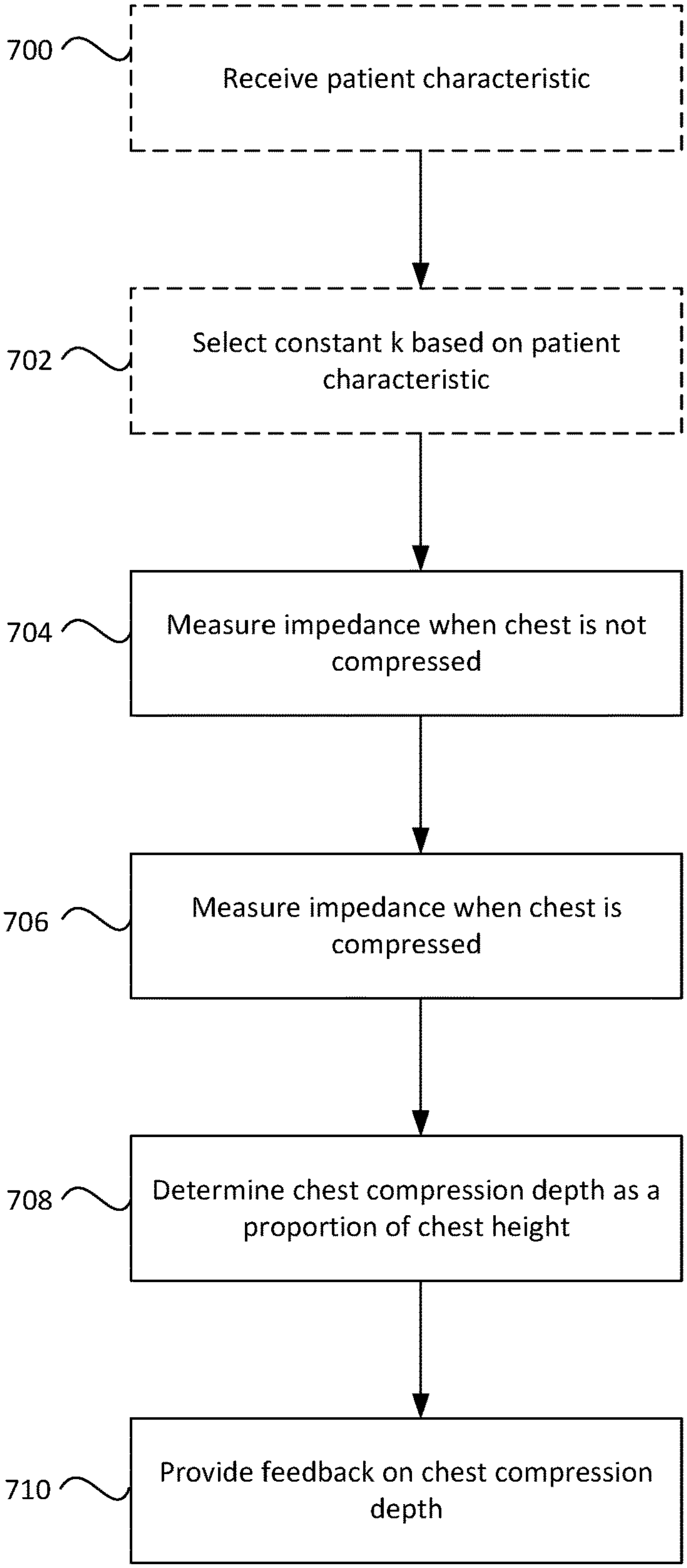
FIG. 7 illustrates an operation of the CPR assist real-time feedback device according to some embodiments of the disclosure.

FIG. 7 illustrates an operation of the CPR assist real-time feedback assembly 100 according to embodiments of the disclosure. In optional operation 700, a user may enter the type of patient or characteristic of the patient that is present, such as the size or weight of the patient at the user interface 118. In optional operation 702, the one or more processors 114 can then determine with constant k value to use from memory 116 based on the selected characteristic.

In operation 704, an impedance measurement is taken when the chest of the patient 104 is not compressed through the first electrode assembly 102 and the second electrode assembly 106. Another impedance measurement is taken in operation 706 when the chest of the patient 104 is compressed.

The one or more processors 114 can then determine the depth of the chest compression as a proportion of chest height in operation 708. As mentioned above, the impedance measurements may be determined continuously and stored in memory 116. In some embodiments, the one or more processors 114 can determine which impedance measurements are related to when the chest is not compressed and when the chest is compressed by comparing the differences in the impedance measurements. For example, an impedance measurement will be highest when the chest compression has not yet begun and will decrease as the chest is compressed. When the chest is being released from the compression, the impedance measurement will begin to increase again. That is, as the chest is compressed and released, the impedance measurement will oscillate, similar to a sine wave. Using this information, the one or more processors 114 can determine which measurements are from when the chest is not compressed and when the chest is compressed to determine the chest compression depth as a proportion of the chest height.

In operation 710, the one or more processors can instruct the user interface 118 to provide feedback to the rescuer regarding the chest compression depth. This can be done either visually or audibly.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media or memory means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

I claim:

1. A medical device for indicating a chest compression depth, comprising:

a first electrode assembly structured to be disposed on a chest of a patient;

a second electrode assembly structured to be disposed on a back of the patient;

a processor configured to determine a chest compression depth as a proportion of chest height based on a first impedance measurement between the first electrode assembly and the second electrode assembly when the chest is not compressed and a second impedance measurement between the first electrode assembly and the second electrode assembly when the chest is compressed; and a user interface configured to receive a patient size, wherein the processor is further configured to determine the chest compression depth as the proportion of chest height based on the received patient size, and wherein the determination comprises:

comparing the received patient size with past patient data stored in a memory, selecting a constant value corresponding to a proportional relationship between the received patient size and the first and second impedance measurements, the constant value being selected from one or more stored constant values based on the comparison between the received patient size and the past patient data, and multiplying the constant value with a difference between the first and second impedance measurements.

2. The medical device of claim 1, wherein the user interface is further configured to provide feedback to a rescuer regarding the chest compression depth.

3. The medical device of claim 2, wherein the feedback includes whether the chest compression depth is adequate, too shallow, or too deep.

4. The medical device of claim 3, wherein an adequate compression depth as the proportion of chest height is from 20 percent to 34 percent.

5. The medical device of claim 4, wherein an adequate compression depth as the proportion of chest height is from 23 percent to 25 percent.

6. The medical device of claim 1, wherein the patient size is selected from a group including pediatric, underweight, average weight, and overweight.

7. The medical device of claim 1, wherein each of the first electrode assembly and the second electrode assembly includes at least two electrodes that are electrically isolated from each other, with one electrode used to deliver a current that is used to measure impedance and the other electrode is used to sense the voltage to allow measurement of the impedance.

8. The medical device of claim 1, wherein the first electrode assembly and the second electrode assembly each include at least one electrode having a conductive area greater than or equal to 50 square centimeters.

9. The medical device of claim 1, wherein the first electrode assembly and the second electrode assembly each include at least one electrode having a conductive area less than or equal to 10 square centimeters.

10. The medical device of claim 1, wherein the first electrode assembly and the second electrode assembly each include at least one electrode having a conductive area between 10 square centimeters and 50 square centimeters.

11. The medical device of claim 1, wherein the processor is further configured to generate and store a continuous signal indicating the chest compression depth as the proportion of chest height during cardiopulmonary resuscitation.

12. A method for measuring a chest compression depth as a proportion of chest height, comprising:

measuring a first impedance between a first electrode assembly located on a chest of a patient and a second electrode assembly located on a back of the patient when the chest is not compressed;

measuring a second impedance between the first electrode assembly and the second electrode assembly when the chest is compressed;

receiving, at a user interface, a patient size;

comparing the received patient size with past patient data stored in a memory;

selecting a constant value corresponding to a proportional relationship between the received patient size and the first and second impedance measurements, the constant value being selected from one or more stored constant values based on the comparison between the received patient size and the past patient data; and multiplying the constant value with a difference between the first and second impedance measurements.

13. The method of claim 12, further comprising providing feedback to a rescuer regarding the chest compression depth.

14. The method of claim 13, wherein the feedback includes whether the chest compression depth is adequate, too shallow, or too deep.

15. The method of claim 14, wherein an adequate compression depth as the proportion of chest height is from 20 percent to 34 percent.

16. The method of claim 15, wherein an adequate compression depth as the proportion of chest height is from 23 percent to 25 percent.

17. The method of claim 12, further comprising receiving an indication of a patient type and determining the chest compression depth as the proportion of chest height based on the received patient type.

18. The method of claim 17, wherein the patient type is selected from a group including pediatric, underweight, average weight, and overweight.

19. The method of claim 12, further comprising determining a depth of a chest compression based on the first impedance and the second impedance for each chest compression and generating a continuous signal indicating the chest compression depth as the proportion of chest height during cardiopulmonary resuscitation.

20. A medical device for determining a compression depth, comprising a first electrode assembly structured to be placed on a chest of a patient, the first electrode assembly including at least one electrode;

a second electrode assembly structured to be placed on a back of the patient, the second electrode assembly including at least one electrode;

a controller configured to determine a first impedance of the patient based on a first signal from the first electrode assembly and the second electrode assembly when the chest of the patient is not compressed, determine a second impedance of the patient based on a second signal from the first electrode assembly and the second electrode assembly when the chest of the patient is compressed, and determine a percentage of compression depth as a proportion of the chest height based on the first impedance and the second impedance;

a user interface configured to receive a patient size, wherein the controller is further configured to determine the compression depth as the proportion of chest height based on the patient size, and wherein the determination comprises:

comparing the received patient size with past patient data stored in a memory selecting a constant value corresponding to a proportional relationship between the received patient size and the first and second impedance measurements, the constant value being selected from one or more stored constant values based on the comparison between the received patient size and the past patient data, and multiplying the constant value with a difference between the first and second impedance measurements.

21. The medical device of claim 20, wherein the user interface is further configured to provide feedback to a rescuer regarding the chest compression depth.

22. The medical device of claim 20, wherein the first electrode assembly and the second electrode assembly each include a matrix of electrodes, and the controller is configured to determine the first impedance for each electrode of the electrode matrices and the second impedance for each electrode of the electrode matrices and determine the percentage of compression depth as a proportion of the chest height based on the electrodes of the electrode matrices that have the greatest difference in impedance values.

* * * * *